(12) United States Patent
Zhao et al.

(10) Patent No.: US 9,971,945 B2
(45) Date of Patent: May 15, 2018

(54) VISION-BASED WET ROAD SURFACE CONDITION DETECTION USING TIRE SIDE SPLASH

(71) Applicant: GM GLOBAL TECHNOLOGY OPERATIONS LLC, Detroit, MI (US)

(72) Inventors: Qingrong Zhao, Madison Heights, MI (US); Qi Zhang, Sterling Heights, MI (US); Jinsong Wang, Troy, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 14/957,998

(22) Filed: Dec. 3, 2015

(65) Prior Publication Data

US 2017/0161573 A1    Jun. 8, 2017

(51) Int. Cl.
  *G06K 9/00* (2006.01)
  *B60W 40/06* (2012.01)
  *G06K 9/32* (2006.01)
  *H04N 7/18* (2006.01)

(52) U.S. Cl.
  CPC ......... *G06K 9/00798* (2013.01); *B60W 40/06* (2013.01); *G06K 9/00791* (2013.01); *G06K 9/3233* (2013.01); *H04N 7/183* (2013.01); *B60W 2420/42* (2013.01); *B60W 2550/14* (2013.01); *B60W 2710/06* (2013.01); *B60W 2710/18* (2013.01); *B60W 2720/40* (2013.01); *B60W 2750/40* (2013.01); *G06T 2207/10024* (2013.01); *G06T 2207/20024* (2013.01); *G06T 2207/30256* (2013.01)

(58) Field of Classification Search
None
See application file for complete search history.

(56) References Cited

U.S. PATENT DOCUMENTS

2014/0081507 A1* 3/2014 Urmson ................ B60W 40/06
                                                         701/28
2016/0379065 A1* 12/2016 Hartmann .......... G06K 9/00798
                                                         348/148

* cited by examiner

*Primary Examiner* — Shelley Chen
(74) *Attorney, Agent, or Firm* — Quinn IP Law

(57) ABSTRACT

A method for determining a wet surface condition of a road. An image of a road surface is captured by an image capture device of the host vehicle. The image capture device is mounted on a side of the host vehicle and captures an image in a downward direction. Identifying in the captured image, by a processor, a region of interest. The region of interest is in a region sideways to a face of the wheel. The region of interest is representative of where sideways splash as generated by the wheel occurs. A determination is made whether water is present in the region of interest. A wet road surface signal is generated in response to the identification of water in the region of interest.

23 Claims, 6 Drawing Sheets

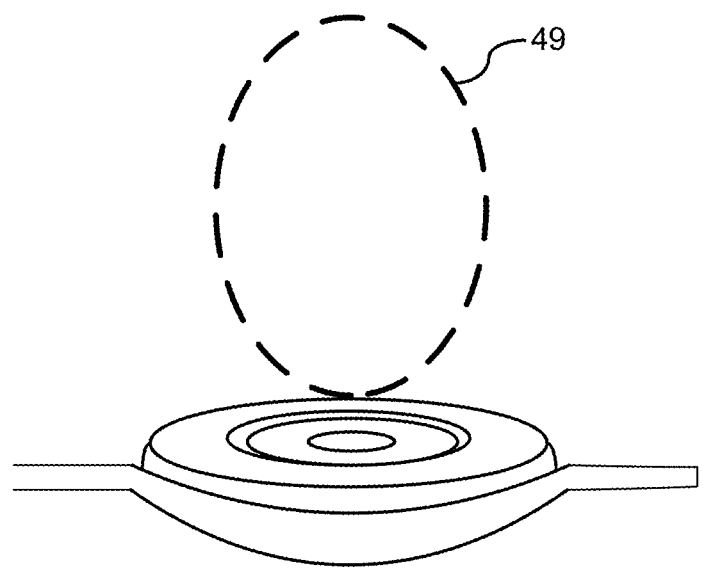
Fig. 8
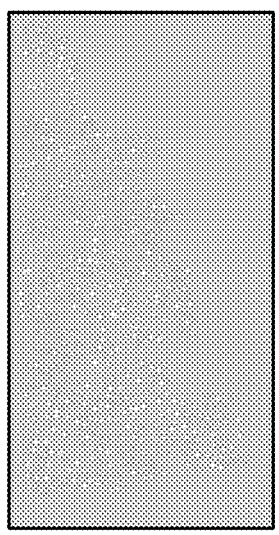 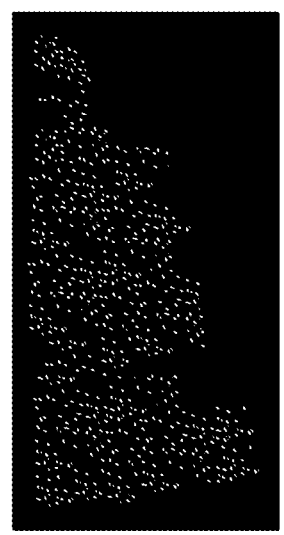
Fig. 9          Fig. 10

US 9,971,945 B2

VISION-BASED WET ROAD SURFACE CONDITION DETECTION USING TIRE SIDE SPLASH

BACKGROUND OF INVENTION

An embodiment relates generally to detection of a wet road surface using detection of tire side splash.

Precipitation on a driving surface causes several different issues for a vehicle. For example, water on a road reduces the coefficient of friction between the tires of the vehicle and the surface of the road resulting in vehicle stability issues. Detection of precipitation on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

SUMMARY OF INVENTION

An advantage of an embodiment is the detection of water on a road using a vision-based imaging device that identifies precipitation dispersed from the surface of the road to a side of the vehicle wheel. The technique described herein requires no excitations from the vehicle or driver for initiating a determination of whether precipitation is present. Rather, precipitation is determined in response to monitoring splash to a side of a vehicle wheel. The technique preferably captures an image that includes water splash in various directions. The technique utilizes a polarized image of the captured scene and applies edge filtering to identify short discontinuous vertical lines representative of water splash. Binary imaging is thereafter used to further enhance the image for detecting edges within the captured image. A correlation analysis is applied to analyze correlation degree among white-color pixels in a vertical direction in the binary image by using a co-occurrence matrix technique. The greater a degree of precipitation present, a greater degree of correlation is identified in the co-occurrence matrix technique.

An embodiment contemplates a method of determining a wet surface condition of a road. An image is captured of a road surface by an image capture device of the host vehicle. The image capture device is mounted on a side of the host vehicle and captures an image in a downward direction. A region of interest is identified in the captured image by a processor. The region of interest is in a region sideways to a face of the wheel. The region of interest is representative of where sideways splash as generated by the wheel occurs. A determination is made whether water is present in the region of interest. A wet road surface signal is generated in response to the identification of water in the region of interest.

BRIEF DESCRIPTION OF DRAWINGS

FIG. 8 illustrates an image captured of a dry road surface.

FIG. 9 illustration an exemplary polarized image of the dry road surface.

FIG. 10 illustrates a binary converted image of the polarized image of the dry road surface.

DETAILED DESCRIPTION

Figure 1:
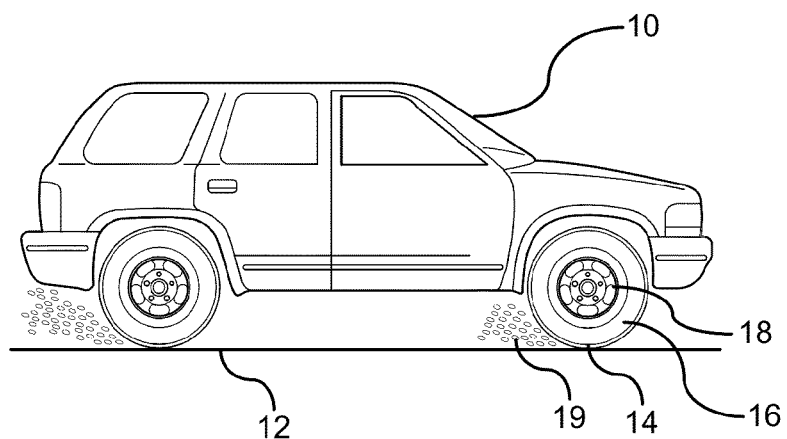
FIG. 1 illustrates a block diagram of a wet road surface detection system.

There is shown in FIG. 1, a vehicle 10 traveling along a vehicle road 12. Precipitation 19, in the form of water, shown disposed on the vehicle road 12 is often displaced by the vehicle wheel 14 and tires 16 mounted on a rim 18 of the wheel 14 as the tires rotate over the wet surface on the vehicle road 12. It is often advantageous to know when the vehicle will be traveling along a wet vehicle road 12 so that issues resulting from water, such as loss of traction or engine degradation resulting from water entering exterior air intake vents can be negated or at least mitigated.

Precipitation 19 on the vehicle road 12 can result in a reduction of traction when driving on the wet road surface. The precipitation 19 disposed on the vehicle road 12 lowers the coefficient of friction between the vehicle tires and the vehicle road 12. As a result, traction between the vehicle tires and the vehicle road 12 is lowered. Loss of traction can be mitigated by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle. It should be understood that the embodiments described herein can be applied to other types of systems aside from automobiles where detection of a wet road surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Figure 3:
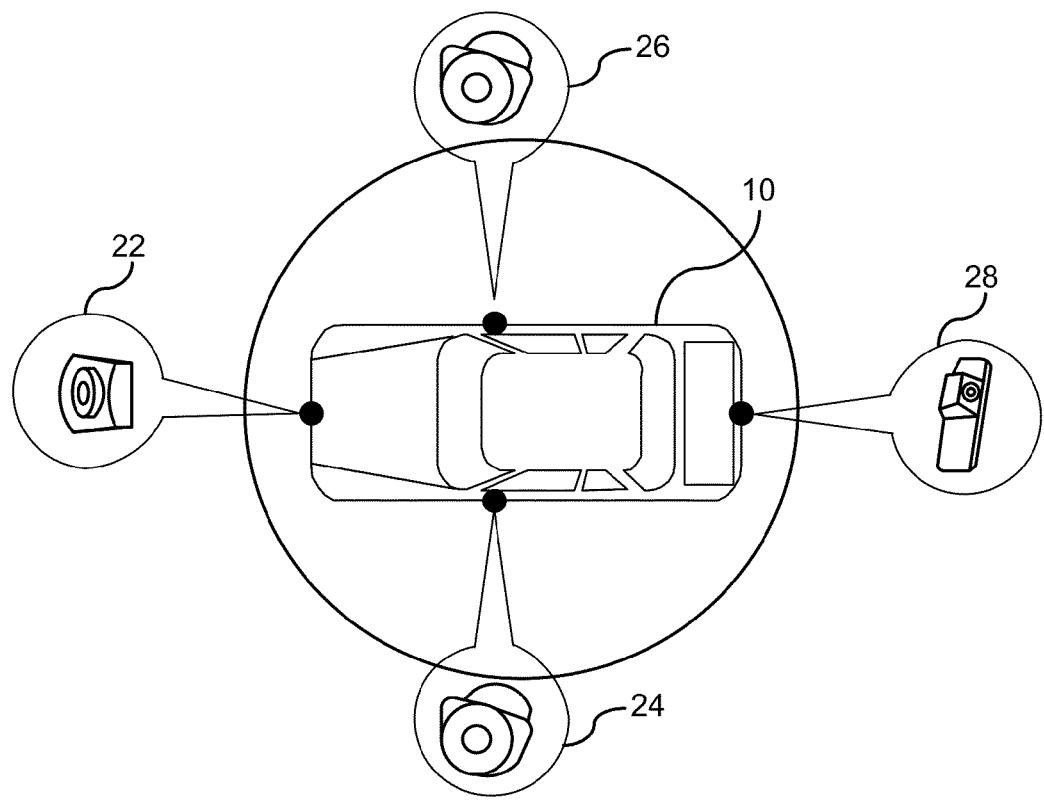
FIG. 3 is an exemplary perspective view of a vehicle surround having surround view coverage.
Figure 2:
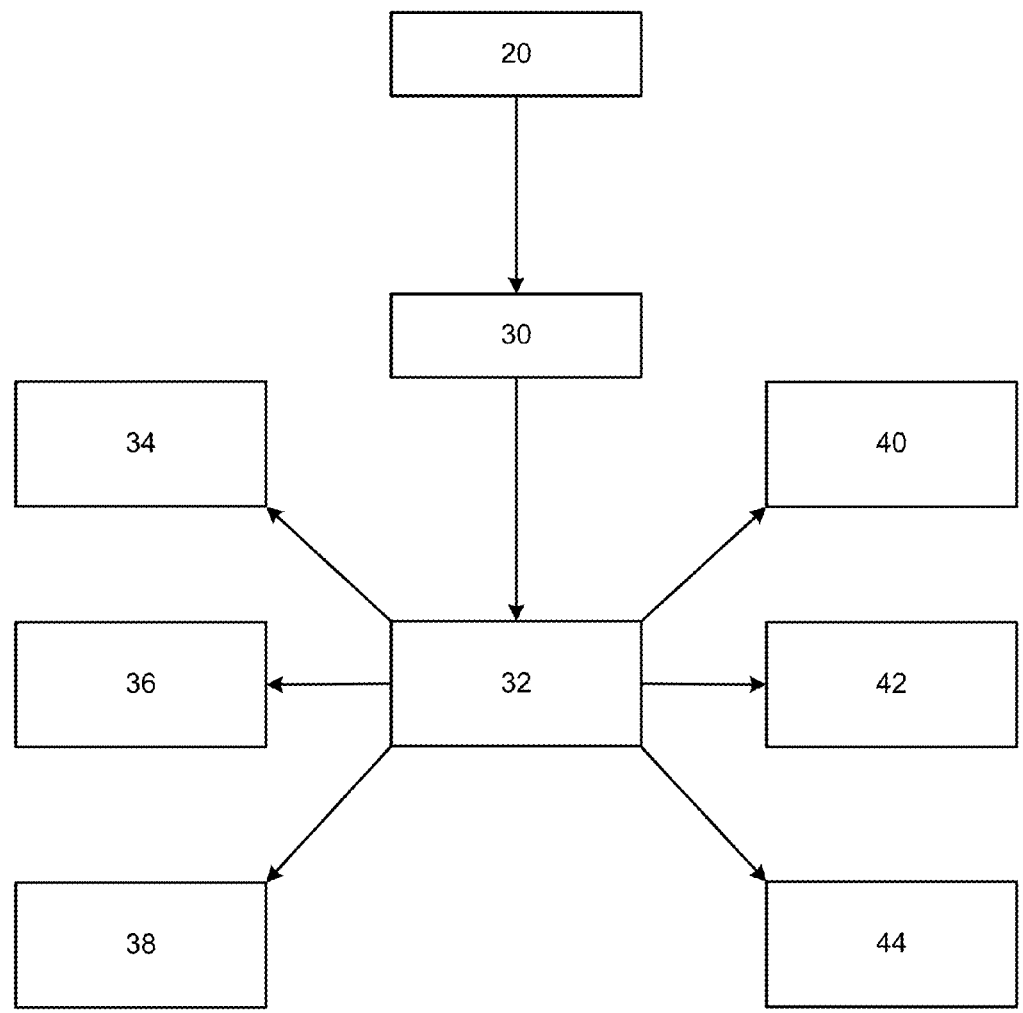
FIG. 2 is an exemplary perspective view of a vehicle scene on a wet surface captured by a camera.

FIG. 2 illustrates a block diagram of a wet road surface detection system. A plurality of vehicle-based image capture devices 20 are mounted on the vehicle for capturing images around the vehicle. The plurality of vehicle based image capture devices 20 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 is mounted to a front of the vehicle capturing image forward and partially to the sides of the vehicle. A driver's side camera 24 captures images on the driver side of the vehicle.

A passenger's side camera 26 captures images on the passenger side of the vehicle. A rearward facing camera 28 captures images rearward and to the side of the vehicle.

Referring again to FIG. 2, a processor 30 processes the images captured by the image capture devices 20. The processor 30 analyzes images and data to determine whether water is present as kicked up by the wheel of the vehicle 10. Since the camera is preferably fixed on the vehicle having a fixed posed position, the wheel position in the image is fixed. As a result, the region of interest is predetermined and is performed offline at the time of camera calibration. Then the processor can easily localize the region of interest online. The processor 30 may be part of an existing system, such as traction control system or other system, or can be a stand-alone processor dedicated to analyzing data from the image capture devices 20.

The processor 30 may be coupled to one or more output devices such as a controller 32 for initiating or actuating a control action if water is found in the region of interest. One or more countermeasures may be actuated for mitigating the effect that the water may have on the operation of the vehicle.

The controller 32 may be part of the vehicle subsystem or may be used to enable a vehicle subsystem for countering the effects of the water. For example, in response to a determination that the road is wet, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove water from the vehicle brakes once the vehicle enters the water. Removal of water build-up from the wheels and brakes maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when water is detected on the road surface.

The controller 32 may control a cruise control system 38 which can deactivate cruise control or restrict the activation of cruise control when water is detected on the road surface.

The controller 32 may control a driver information system 40 for providing warnings to the driver of the vehicle concerning water that is detected on the vehicle road. Such a warning actuated by the controller 32 may alert the driver to the approaching water on the road surface and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing water ingestion into an engine of the vehicle. Under such conditions, the controller 32 automatically actuates the closing of the air baffles 42 when water is detected to be present on the road surface in front of the vehicle and may re-open the air baffles when water is determined to no longer be present on the road surface.

The controller 32 may further control the actuation of a wireless communication device 44 for autonomously communicating the wet pavement condition to other vehicles utilizing a vehicle-to-vehicle or vehicle-to-infrastructure communication system.

The controller may further provide the wet road surface signal alerts to a driver of the vehicle against a use of automated features that include, but are not limited to, Adaptive Cruise Control, Lane Following, Lane Change, Evasive/Assist Steering Maneuver, Automated Emergency Braking, etc.

The advantage of the techniques described herein is that no excitations are required from the vehicle or driver for initiating a determination of whether water is present. That is, prior techniques require some considerable excitation by the vehicle whether by way of a braking maneuver, increased acceleration, steering maneuver so as for surface water detection. Based on the response (e.g., wheel slip, yawing), such a technique determines whether the vehicle is currently driving on water. In contrast, the techniques described herein do not require driver excitations for determining water on the road.

Figure 4:
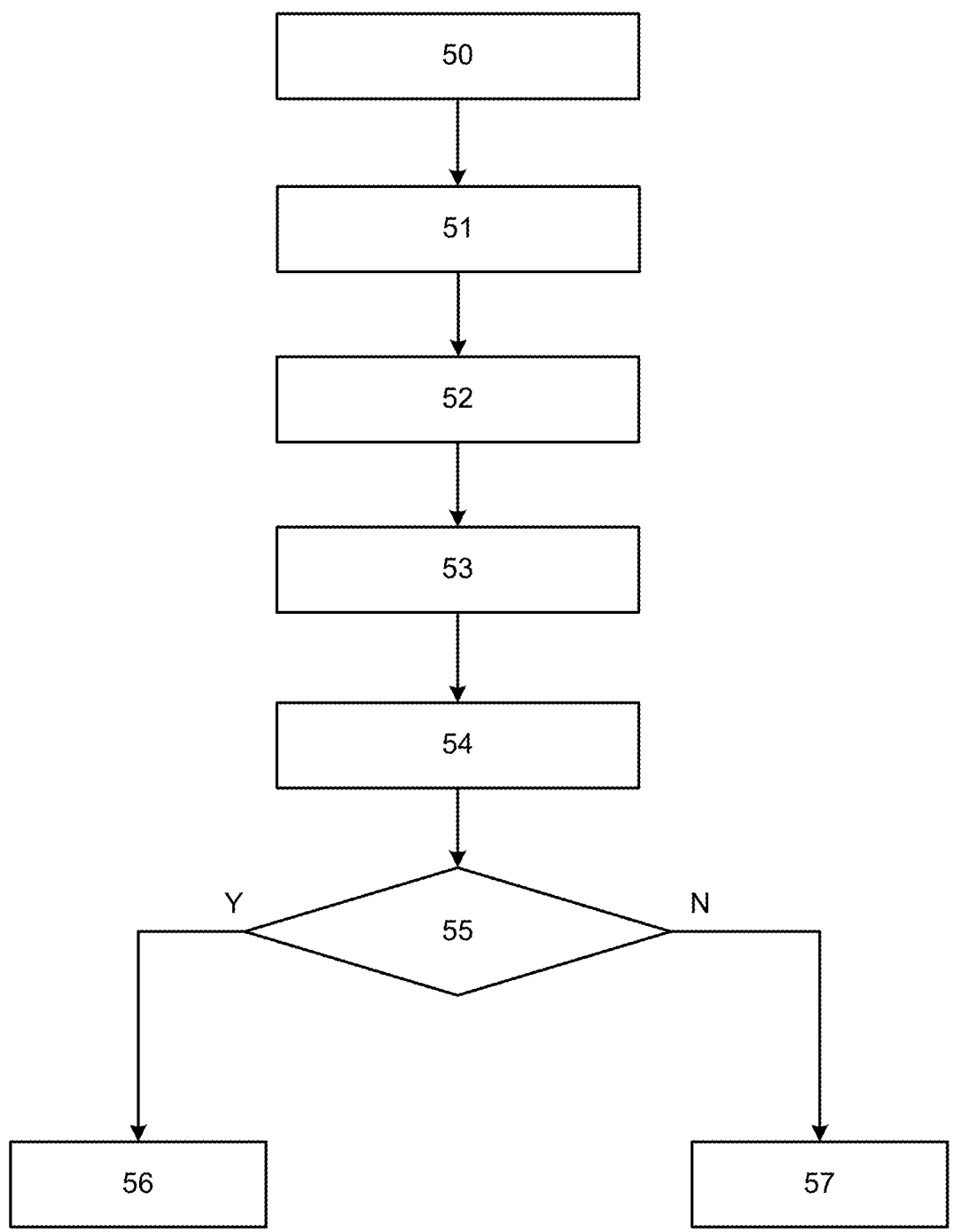
FIG. 4 illustrates a flowchart of a method for detecting a wet surface.
Figure 5:
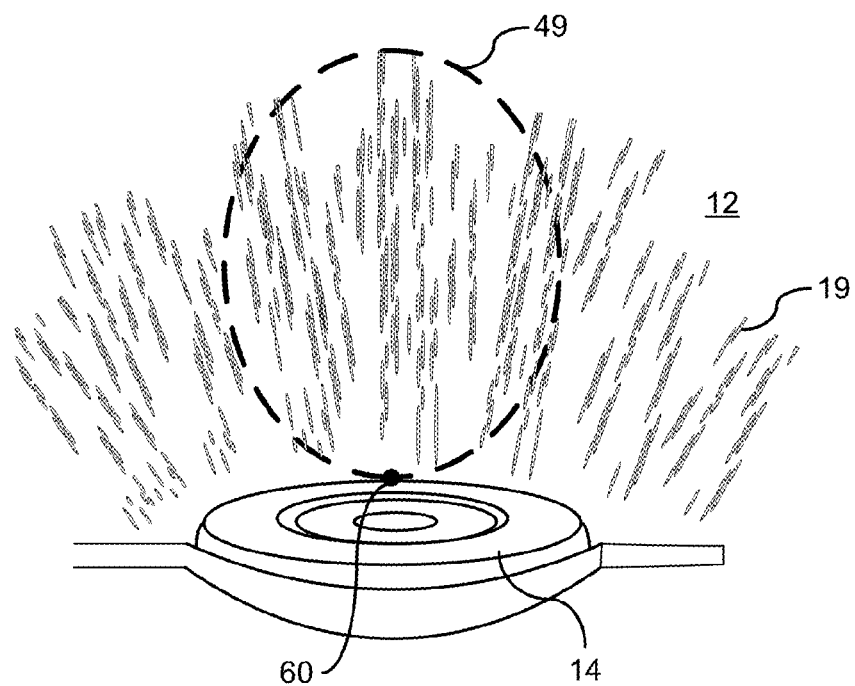
FIG. 5 illustrates an image captured by the image capture device.

FIG. 4 illustrates a flowchart of a method for detecting a wet surface of the road. In step 50, an image is obtained of region juxtaposed to a vehicle wheel of the vehicle. The image is analyzed for obtaining scene information where various characteristics in the scene may be analyzed for determining whether water is present in the image. FIG. 5 illustrates an image captured by the image capture device that is mounted on the side of the vehicle. The image may be processed so that a downward view is captured (i.e., looking down at the road of travel). A lens utilized by a respective image capture device may utilize a fisheye lens where a wide field-of-view is captured (e.g., 180 degrees). Image processing may also be applied to change the pose of the camera such that pose, as viewed in the image, is directed downward. For example, if an image from one of the respective side cameras is utilized, then a respective location in the image, although not the focal point of the camera pose, may utilized for generating a virtual pose which renders the scene as if the camera where looking directly downward capturing the wheel 14, the road surface 12, and water 19. To change the pose, a virtual camera model may be used with the captured image such that a virtual pose is utilized to reorient the image so that a virtual image is generated as if the camera is reoriented and facing a different direction (e.g., facing directly downward). Reorienting the image to generate the virtual image includes identifying the virtual pose and mapping of each virtual point on the virtual image to a corresponding point on the real image. The term pose as used herein refers to a camera viewing angle (whether real camera or virtual camera) of a camera location defined by the camera coordinates and the orientation of a camera z-axis. The term virtual camera as used herein is referred to a simulated camera with simulated camera model parameters and simulated imaging surface, in addition to a simulated camera pose. Camera modeling as performed by the processor is described herein as obtaining a virtual image which is a synthesized image of the scene using the virtual camera modeling.

Referring again to FIG. 4, in step 51, a region of interest is identified from the real image or virtual image. This technique localizes the region of interest which identifies a respective region relative to where dispersed water is anticipated if side splash is present. The region of interest for dispersed water for side splash typically extends radially outward from the side of the wheel. As shown in FIG. 5, the exemplary region identified by 49 represents region of interest in the image.

Referring again to FIG. 4, in step 52, polar coordinate conversion is applied to the image. Polar coordinate conversion converts the original region of interest image into a polarized image. Polar coordinate conversion utilizes a polar coordinate system which is a two dimensional coordinate system where each point on a plane is determined by a distance from a reference point and an angle from a respective reference direction. Typically, the reference point is referred to as a pole, which is shown as element 60 in FIG. 5. The reference direction is commonly referred to as a polar axis. The distance from the pole is referred to herein as the radius. Each pixel within the region of interest is mapped to a polarized image utilizing the radius and the angle.

Figures 6, 7:
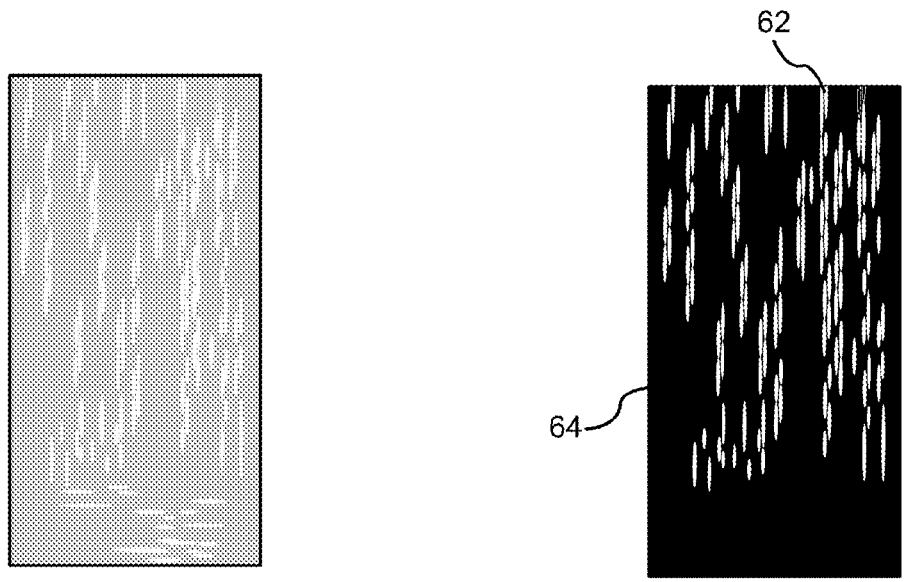
FIG. 6 illustrates an exemplary polarized image.
FIG. 7 illustrates a binary conversion image.

FIG. 6 illustrates an exemplary polarized image. The y-axis represents the radius (R) to each pixel from the pole. The x-axis represents the angle in degrees relative to a reference direction. Converting the original image into polar coordinate system helps unify linear movements of the water splash of all directions into only vertical directions. This assists in simplifying the image analysis for identifying water in the image. As shown in FIG. 6, the vertical streaks represent water in the image.

Referring again to FIG. 4, in step 53, dispersed water analysis is performed to determine whether water is present in the region of interest. Edge detection may be performed utilizing a filter, such as a Sobel filter The Sobel filter performs a 2-D spatial gradient measurement on an image. The filter computes an approximation of absolute gradient magnitude at each point in an input grayscale image. Herein, the focus is only on gradient information in the vertical direction. The gradient is computed by convolving input image with a certain mask. The mask is designed to respond maximally to edges running vertically relative to the pixel grid. That is, the Sobel filter works like as first order derivate and calculates the difference of pixel intensities in an image. The identified edges assist in determining edges between water and a non presence of water. The edge detection highlights linear movements of texture within the captured image. The texture is represented by many discontinuous short vertical lines in an image where splash is present. In contrast, if the surface is either dry or a snow covered surface, then the texture of the dry or snow covered surface has no linear movement patterns. It should be understood that other types of filtering may be used aside from Sobel filtering for identifying edges in the image without deviating from the scope of the invention.

In addition, binary conversion is applied to the image such that any water is highlighted and easier to identify. FIG. 7 represents a binary conversion where water 62 is represented as a white color with pixel value 1 in contrast to a presence of non-water 64, which is represented as a black color with pixel value 0.

Referring again to FIG. 4, in step 54, correlation analysis is conducted to analyze the texture within the binary image by utilizing a gray-level co-occurrence matrix technique. The correlation analysis focuses on analyzing correlation relationships among white-color pixels in a vertical direction in the binary image. The gray-level co-occurrence matrix characterizes the texture of the image by calculating how often pairs of white-color pixels in vertical direction occur in the image. Statistical measures including, but not limited to, a degree of correlation are extracted from this co-occurrence matrix. As a result, watery surfaces with side splash, as illustrated in FIG. 7, show a stronger correlation among white-color pixels in the vertical direction in comparison to a no-splash surface condition.

FIGS. 8-10 represent a no-splash condition analysis. FIG. 8 illustrates an image capture of a road surface relative to a vehicle wheel while driving a dry road surface. The region 49 sideways of the tire is analyzed.

FIG. 9 illustrates an exemplary polarized image. The conversion of the original image into polar coordinate system will assist in unifying linear movements of the water splash if present.

FIG. 10 illustrates binary conversion applied to the image such that any water is highlighted and easier to identify. Water present on the surface would be identified as white lines in the binary converted image extending vertically. As shown in FIG. 10, no vertical lines are present which indicates a lack of presence of water being splashed into the air.

Figure 11:
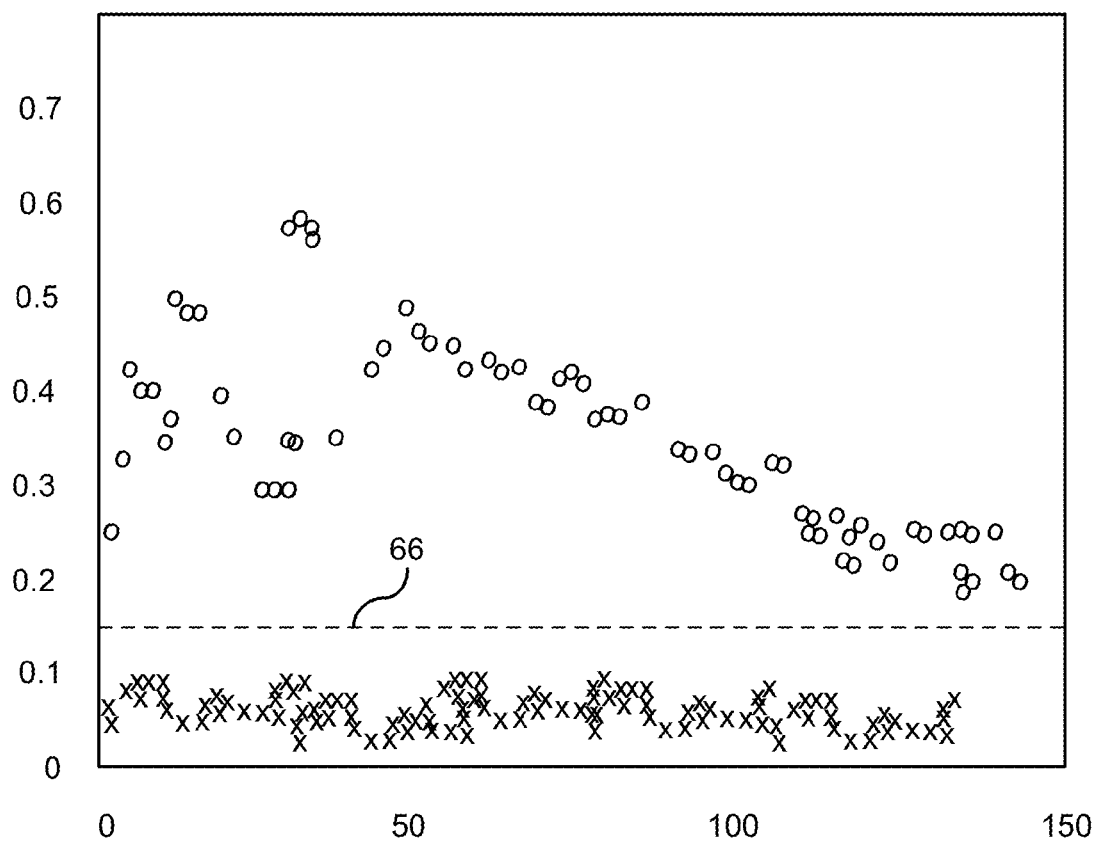
FIG. 11 represents an exemplary graph illustrating exemplary correlation analysis results.

FIG. 11 represents an exemplary correlation analysis results. This graph illustrates sample images collected from dry and wet surfaces after the co-occurrence matrix technique is applied to the polarized binary image. An x-axis represents an image sample number whereas the y-axis represents the degree of texture correlation. Based on the texture analysis a degree of texture correlation is shown for both splashes and ideal dry surfaces. The symbols "o" represents splashes whereas symbol "x" represents an ideal dry surface. Utilizing a trained classifier, a separation, represented by a threshold 66, among the distribution of samples in the feature space is clearly distinguished between splashes and the ideal dry surface.

Referring again to FIG. 4, in step 55, a determination is made whether the correlation is greater than the threshold. If the determination is made that the correlation is greater than the threshold, then the routine proceeds to step 56; otherwise, the routine proceeds to step 57.

In step 56, in response to a determination that correlation is greater than the threshold, a wet surface indicator flagged is set indicating water is present in the region of interest. A signal is communicated to a controller where various vehicle operations as described earlier can be actuated that include, but are not limited to, braking control, traction control, speed control, driver warning, air baffle control, and vehicle to vehicle communication.

If the determination was made in step 55 that water was not present in the region of interest, then the routine proceeds to step 57 where other additional techniques may be utilized to verify whether water is present or not.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet surface condition of a road, the method comprising:
   capturing an image of a road surface by an image capture device of a motor vehicle, the image capture device being mounted on the motor vehicle and capturing the image in a downward direction;
   identifying in the captured image, by a processor, a region of interest, the region of interest being in a region sideways to a face of a road wheel of the motor vehicle, the region of interest representative of where sideways splash as generated by the road wheel occurs;
   determining whether or not water is present in the region of interest, including:
      converting the captured image into a polarized image;
      identifying within the polarized image a pole in the region of interest;

identifying a polar axis originating from the pole; and
generating a polar coordinate system within the polarized image as a function of radii and angles, each of the radii in the polarized image determined as a respective distance from the pole to each of a plurality of image pixels, and each of the angles in the polarized image determined as a respective angle between the polar axis and each of the image pixels; and
generating a wet road surface signal in response to a determination that water is present in the region of interest.

2. The method of claim 1, wherein the polarized image maps the region of interest to show only linear vertical directions of water splash.

3. The method of claim 1, wherein the polarized image unifies multidirectional linear movements of water splash in the region of interest into only vertical directions.

4. The method of claim 1, further comprising applying a filter to the polarized image to identify vertical lines representative of water splash in the region of interest.

5. The method of claim 4, wherein applying the filter includes applying a texture classification filter that identifies linear movement patterns of water splash within the region of interest.

6. The method of claim 5, wherein applying the filter further includes applying a Sobel filter that performs a 2-D spatial gradient measurement on the polarized image.

7. A method for determining a wet surface condition of a road surface, the method comprising:
capturing an image of the road surface by an image capture device of a motor vehicle, the image capture device being mounted on the motor vehicle and operable to capture images in a downward direction;
identifying, in the captured image by a processor, a region of interest proximate a road wheel of the motor vehicle, the region of interest corresponding to an area adjacent the road wheel where dispersed water is anticipated during operation of the motor vehicle;
determining whether or not water is present in the region of interest, including:
converting the captured image into a polarized image;
applying an edge filter to the region of interest within the polarized image; and
receiving a response from the edge filter that identifies an edge between a presence of water and a non-presence of water in the region of interest by distinguishing linear movement texture in the polarized image, the texture represented by discontinuous vertical lines in the polarized image; and
generating a wet road surface signal in response to a determination that water is present in the region of interest.

8. The method of claim 7, wherein determining whether or not water is present in the region of interest further includes applying a binary conversion to the filtered image to further distinguish the presence of water from the non-presence of water.

9. The method of claim 8, wherein the binary conversion converts pixels representing water to a white color and pixels representing a non-presence of water to a black color.

10. A method for determining a wet surface condition of a road surface, the method comprising:
capturing an image of the road surface by an image capture device of a motor vehicle, the image capture device being mounted on the motor vehicle and operable to capture images in a downward direction;
identifying, in the captured image by a processor, a region of interest proximate a road wheel of the motor vehicle, the region of interest corresponding to an area adjacent the road wheel where dispersed water is anticipated during operation of the motor vehicle;
determining whether or not water is present in the region of interest including:
converting the captured image into a polarized image;
applying an edge filter to the region of interest within the polarized image; and
applying a correlation analysis by comparing a degree of correlation of white-color pixels in a vertical direction in the filtered image to a correlation threshold, wherein water is determined to be present if the degree of correlation among white-color pixels in the vertical direction of the filtered image is greater than the correlation threshold; and
generating a wet road surface signal in response to a determination that water is present in the region of interest.

11. The method of claim 10, wherein applying the correlation analysis includes applying a gray-level co-occurrence matrix technique to the filtered image.

12. The method of claim 1, wherein capturing the image in the downward direction includes capturing a downward-captured image of the road surface juxtaposed to the road wheel of the motor vehicle.

13. The method of claim 12, wherein capturing the image in the downward direction further includes generating a virtual image in a downward direction based on the downward-captured image, wherein the virtual image is generated by reorienting the downward-captured image so that the virtual image is generated as if a camera pose is facing downward.

14. The method of claim 1, wherein the motor vehicle includes a vehicle braking system and a vehicle controller, the method further comprising transmitting the wet road surface signal to the vehicle controller, the vehicle controller autonomously actuating the vehicle braking system in response to the wet road surface signal.

15. The method of claim 1, wherein the motor vehicle includes a traction control system and a vehicle controller, the method further comprising transmitting the wet road surface signal to the vehicle controller, the vehicle controller autonomously actuating the traction control system in response to the wet road surface signal.

16. The method of claim 1, further comprising transmitting the wet road surface signal to a wireless communication system with an indicator to alert other vehicles of the wet surface condition of the road.

17. The method of claim 1, wherein the wet road surface signal includes an alert to a driver of the motor vehicle of a potential reduced traction between one or more vehicle tires and the road surface.

18. The method of claim 1, wherein the wet road surface signal includes an alert to a driver of the motor vehicle against a use of cruise control.

19. The method of claim 1, wherein the wet road surface signal includes an alert to a driver of the motor vehicle against a use of automated features.

20. The method of claim 1, wherein the motor vehicle includes a cruise control system and a vehicle controller, the method further comprising transmitting the wet road surface signal to the vehicle controller, the vehicle controller autonomously disabling the cruise control system in response to the wet road surface signal.

21. The method of claim 1, wherein the wet road surface signal includes an alert to a driver of the motor vehicle to reduce a vehicle speed.

22. The method of claim 1, further comprising transmitting the wet road surface signal is provided to a vehicle controller of the motor vehicle, the vehicle controller autonomously shutting baffles on an air intake scoop of the motor vehicle.

23. The method of claim 1, further comprising transmitting the wet road surface signal to a vehicle controller of the motor vehicle, the vehicle controller autonomously modifying a control setting of an automated control feature in response to the wet road surface signal.

\* \* \* \* \*

UNITED STATES PATENT AND TRADEMARK OFFICE
CERTIFICATE OF CORRECTION

PATENT NO. : 9,971,945 B2  
APPLICATION NO. : 14/957998  
DATED : May 15, 2018  
INVENTOR(S) : Qingrong Zhao et al.

Page 1 of 1

It is certified that error appears in the above-identified patent and that said Letters Patent is hereby corrected as shown below:

In the Claims

Column 9, Line 5, in Claim 22, "the wet road surface signal is provided to a vehicle controller" should read --the wet road surface signal to a vehicle controller--

Signed and Sealed this  
Thirtieth Day of October, 2018

Andrei Iancu  
*Director of the United States Patent and Trademark Office*